United States Patent [19]
Gardner

[11] Patent Number: 4,738,550
[45] Date of Patent: Apr. 19, 1988

[54] TILTING PAD THRUST BEARING WITH OPTIMIZED TILT AXIS LOCATION

[75] Inventor: Willis W. Gardner, Waukesha, Wis.

[73] Assignee: Waukesha Bearings Corporation, Waukesha, Wis.

[21] Appl. No.: 67,345

[22] Filed: Jul. 7, 1987

Related U.S. Application Data

[63] Continuation-in-part of Ser. No. 904,207, Sep. 8, 1986, abandoned.

[51] Int. Cl.$^4$ .......................... F16C 17/06; F16C 32/06
[52] U.S. Cl. .................................... 384/306; 384/122; 384/308
[58] Field of Search ........ 384/117, 121, 122, 302-312, 384/420

[56] References Cited

U.S. PATENT DOCUMENTS 2,857,217 10/1958 Maynard .
2,955,003 10/1960 Sheppard .
3,398,997 8/1968 Wucherer .
3,829,180 8/1974 Gardner .

FOREIGN PATENT DOCUMENTS 1525052 5/1969 Fed. Rep. of Germany .
194123 11/1984 Japan .

OTHER PUBLICATIONS

Rightmire, D. K. et al., "An Experimental Investigation of a Tilting-Pad, Complaint-Surface, Thrust Bearing," *Journal of Lubrication Technology*, Trans. ASME, Presented Oct. 21-23, 1975.

Sides, N. T. et al., "Performance Characteristics of Oil Lubricated Swing-Pad Thrust Bearings With Different Radii of Curvature", Report No. DTNSRDC-80/122 (David Taylor, Naval Ship Research and Development Center), published Dec., 1980.

*Primary Examiner*—Stuart S. Levy
*Assistant Examiner*—Thomas R. Hannon
*Attorney, Agent, or Firm*—Fuller, Puerner & Hohenfeldt

[57] ABSTRACT

A tilting pad thrust bearing in which the sector-shaped pads are supported on individual disks. A runner runs on top of the pads. The disks have a spherical element projecting from their bottoms. The elements make tangential contact with a stationary support ring and the pads and disks tilt about an axis on which the point of tangency lies. The tilt axis of each pad is located at 70% to 80% of the length of an arc extending from the leading edge to the trailing edge of the pad midway between the radially outermost and innermost edge of the pad.

11 Claims, 4 Drawing Sheets

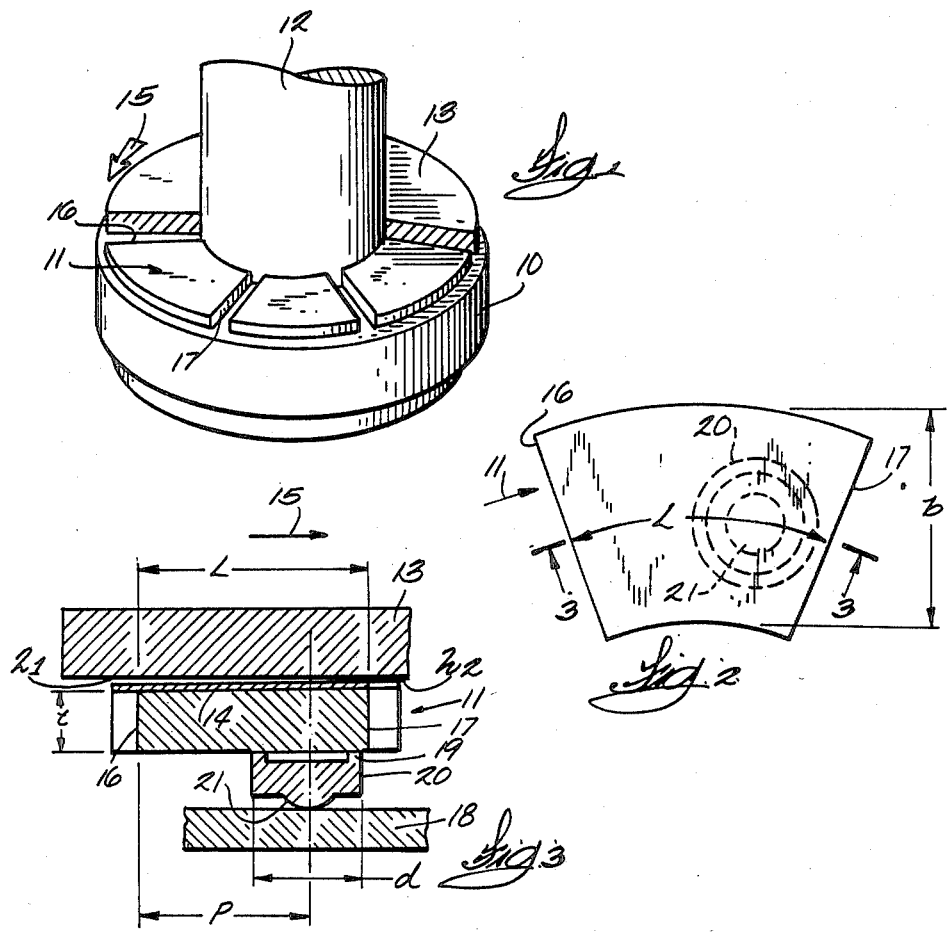

900 PSI 4000 RPM
OIL IN 120°F

TILTING PAD THRUST BEARING WITH OPTIMIZED TILT AXIS LOCATION

This is a continuation-in-part of co-pending application Ser. No. 904,207 filed on Sept. 8, 1986 now abandoned.

BACKGROUND OF THE INVENTION

Tilting pad thrust bearings contain a plurality of bearing pads which are each supported on a disk for tilting in a retainer ring on a hardened spherical pivot button which extends from the bottom of the disk. The pads are flooded with circulating lubricant. A rotating thrust collar or runner bears on the top surfaces of the pads and rides on an oil film on the top surface of the pads. The bearing pads are usually made of steel that is faced with a low friction material such as babbitt.

As the runner rotates, it shears the oil film that separates the runner from the bearing pad faces and generates heat at the surface of the pads. This results in a temperature differential across each pad and through each pad. The top surface is the hottest so it assumes a slightly convex shape. The convexity or downward bending of the leading and trailing edges of the pads distorts the oil film on the bearing surface and influences its load-bearing capacity. The load on the pad causes a further downward bending of the pad about its pivot point and this also affects load bearing capacity, but the bending due to temperature differences is normally several times greater than that due to pressure.

The term "leading edge" as used herein is the edge of a bearing pad that would be traversed first by any line on the runner moving in the direction of rotation or translation over the series of circularly arranged or linearly arranged bearing pads. The "trailing edge" then is the edge of the pad over which said point or line is second to pass in the direction of rotation or translation of the runner.

Because of hydrodynamic forces generated in the liquid lubricant, it has been found desirable to mount the pads for tilting on a point of contact between a spherical surface and a planar surface. The tilting action results in the maximum lubricant film thickness ($h_1$) developing, of course, at the leading edge of the pads and a minimum film thickness ($h_2$) developing at the trailing edge of the pads. In the design of tilting pad bearings, it is an objective, as in the case of the present invention, to reduce the film pressure, maximize film thickness and minimize the temperature of the lubricant film. The downward deflection or convexity developed by the top working surface of the bearing pads distorts the lubricating oil film between the bearing surface of the pad and the runner and causes, in general, a significant decrease in load-bearing capacity. In actual practice, the deflection for a babbitt-faced steel bearing pad is a few thousandths of an inch, generally varying with bearing size. This is a small amount but it affects the load bearing capacity of the bearing significantly.

Most tilting pad bearing assemblies adapted for use with a rotating runner have a plurality of sector or pie-shaped pads arranged in a circle. The theory of hydrodynamic film lubricated tilting pad thrust bearings is well known to those involved in designing and using large thrust bearings such as for hydraulic turbines and the like. The theory that has been generally accepted as valid indicates that maximum load capacity results when the pad pivot location is offset circumferentially in the direction of runner rotation to an optimum position approximately 0.6 of the length of the pad from its leading edge when the upper bearing surface of the pad is flat and the runner rotates in a single direction. In applications where the runner is rotationally reversible, the pivot point must necessarily be on a line that is centered or midway between the leading and trailing edges of the bearing pads. Theoretical analysis of the hydrodynamic properties of bearing pads that are supported centrally for bidirectional rotation and flat bearing surfaces indicates that an oil film would be developed that has no load bearing capacity at all. Theory and reality do not agree in this case. In actual practice the flat bearings develop some distortion due to heat and load which results in a load bearing capacity by the lubricant being developed. For unidirectional rotatable runners those skilled in the art have accepted establishing the pivot point for the tilting pads at 60% of the distance between their leading and trailing edges. In accordance with the present invention, however, much to the surprise of those who are involved in the design of heavy tilting pad bearings, it has been demonstrated recently by theoretical analysis and practical tests that when distortion is taken into account, the pivot point should be downstream from the leading edge by substantially more than 60% of the width of the bearing pad in accordance with the invention disclosed herein. This has been found to produce a thicker than heretofore obtained lubricant film near the trailing edge which is tantamount of saying that the bearing will have a higher load capacity.

A paper published by the United States Navy Department reports on tests made on two different types of thrust bearings one of which was a tilting pad bearing and the other was another type of thrust bearing. The performance characteristics were compared. The data show that performance of the tilting pad bearing improved as the point on which the pads pivot increased from 50% to 60% to 70% of the distance from the leading to the trailing edge of the pads. An optimized pivot point was not determined nor suggested. The traditional 60% pivot point was not positively challenged. The study was primarily for comparing two types of bearings. The publication is—Nathan T. Sides and Thomas L. Daugherty, "Performance Characteristics of Oil Lubricated Swing-Pad Thrust Bearings with Different Radii of Curvature"—Report No. DTNSRDC-80/122 (David Taylor Naval Ship Research and Development Center), published December, 1980. Government Accession No. AD-A093173.

SUMMARY OF THE INVENTION

An object of the present invention is to provide for reducing lubricant film temperatures, reducing lubricant pressures and increasing the lubricant film thickness in tilting pad bearings. How this general object is achieved and how other more specific objects are achieved will be evident in a more detailed description of a preferred embodiment of the invention which will be set forth in detail hereinafter. Briefly, the main feature of the invention is to prescribe the preferred range of percentages and the optimum percentage of the distance between the leading and trailing edges of the pad for the radially extending line on which the pivot should be located to obtain reduced film temperatures, reduced lubricant pressure and increased film thickness at the trailing edge of the pad. More particularly, the invention resides in locating the pad pivots in the range of 70% to 80% of the distance between the leading and trailing edges of the pads. The optimum point of pivot location is revealed to be at about 75% of the distance between the leading and trailing edges of the pad.

In addition to providing evidence corroborating the efficacy of having the pivot point between 70% and 80% of pad width, a device is disclosed for making the tests that confirm the validity of the pivot location prescribed herein.

A more detailed discussion of an illustrative development of the invention will now be set forth in reference to the drawings.

DESCRIPTION OF THE DRAWINGS

FIG. 1 is a perspective view of a typical tilting pad bearing showing the pads and the casing for holding them and a shaft on which a runner or slider is fastened and is shown partly in section;

FIG. 2 is a plan view of a sector shaped tilting bearing pad;

FIG. 3 shows a section through the bearing pad of the preceding figure taken on a line corresponding to 3—3 in FIG. 2, together with a section of a runner, a section of a tilting support disk and a section of a base plate;

FIGS. 5-11 are plots of pivot location versus maximum measured pad temperature where at least one parameter is varied;

DESCRIPTION OF A PREFERRED EMBODIMENT

Figure 4:
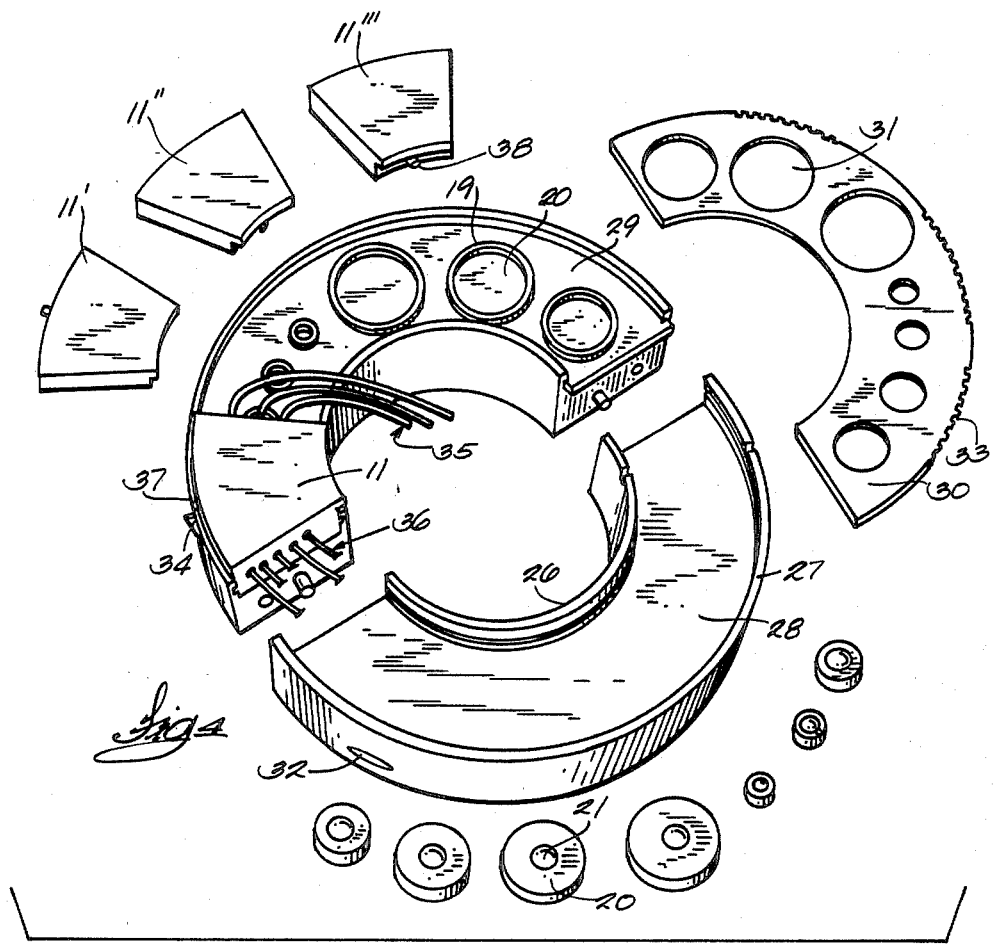
FIG. 4 is an exploded view of the essential parts of a device for performing the tests that will aid in confirming the location of the bearing pad pivots prescribed in accordance with the present invention.

A typical tilting pad bearing assembly is depicted in FIG. 1. It comprises a circular casing marked 10. There are a plurality of tiltable bearing pads 11 arranged in a circle in casing 10. Casing 10 is ordinarily mounted in a machine base such as would be the case in a hydraulic turbine. The load carrying shaft is marked 12 and it has a disk-like runner or slider 13 fastened to it. A section of the runner is cut away to expose the top surfaces of the bearing pads 11. These top surfaces are, typically and for the purposes of the present invention, coated with a layer of babbitt 14 which can be seen in FIG. 3. In FIG. 1, the assumption can be made that the runner 13 is rotating in the direction of the arrow 15. In such case, the edge 16 of the first exposed bearing pad 11 is treated as the leading edge and the other edge will then be the trailing edge which is marked 17.

Attention is now invited to the diagrams in FIGS. 2 and 3. FIG. 2 is a plan or top view of a tilting pad 11 that is used in a rotating thrust bearing. FIG. 3 shows how the pad 11 is supported on a stationary base ring 18 which would be fixed in casing 10 and the latter would be fastened in a machine. Pad 11 is supported, in this example, on the annular rim 19 of a tiltable disk 20. The disk is usually composed of hard steel. A spherical button 21 is formed integrally with and extends from the bottom of disk 20. As is evident, the periphery of the sphere is tangent to the top surface of base ring 18. The diameter of tiltable disk 20 is equal to "d". Bearing pad 11 is sector shaped. Its average or central width is labeled "L". The width L is an arc extending from leading edge 16 to trailing edge 17, which passes across a radially extending line on which the pivot point falls. The pivot point in this example is halfway between the radially outermost and innermost edges 22 and 23 of the pads. The thickness of the tilting pad 11 is designated by the letter "t". The load on one of the typical pads 11 is imposed through runner 13 as demonstrated in FIG. 1. Translation or rotation of the runner in FIG. 3 is indicated by the arrow marked 15. In use, the parts shown are immersed in lubricating oil, not shown, that may be forcibly circulated. When the runner 13 is in motion, all the pads 11 in the circular array of pads tilt and a load carrying film of oil develops, due to well known hydrodynamic principles, between the upper surface of babbitt layer 14 and the lower planar surface of runner 13. The minimum thickness of the film at or near the trailing edge 17 of the pad is designated "$h_2$". Because the pad will develop a slightly convex upper surface, called crowning, due to loading and heating, the minimum oil film thickness may occur inward of the trailing edge of the pad. An objective of the invention is to attain a film thickness $h_2$ that is as thick as possible. The load carrying capacity of the bearing is governed, to a large extent, by the thickness, $h_2$ of the lubricant film. The thickness of the film at the leading edge 16 of pad 11 is designated "$h_1$". The distance from the leading edge 16 of the pad 11 to the pivot point or point of tangency of the spherical button 21 is designated by the letter "P".

Up to the time the inventive concepts of the present invention were confirmed, conventional wisdom among designers of heavily loaded pad thrust bearings was to have the pivot point or radially directed line on which pivoting occurs located so that the distance P was equal to about 60% of the pad length L. A surprise factor in the present invention is that the generally accepted practice of having P at 50% to 60% of L does not result in optimum bearing performance. As will be demonstrated subsequently, in accordance with the invention, desired performance characteristics of the bearing are improved at 70% to 80% and optimum when P is in the range at about 75% of L. Having a pivot location as prescribed by the invention results in an increased film thickness $h_2$. This minimizes heat generated by shearing action on the lubricant which, in turn, results in reduced film temperatures and pressures. In accordance with the invention, the factors that maximize the load carrying capacity of tilting pad bearings when the pivot location P is 70% to 80% of L are synergistic or act in a positive feedback mode with each other. Reducing the pressure in the film in the area of contact when the pivot location is within the prescribed range results in increased film thickness and reduced film temperatures and vice versa. Reduced film pressures result from more effective use of the pad surface because of less crowning when pad temperatures are reduced.

In a paper presented by Rightmire, D. K., et al, "An Experimental Investigation of a Tilting-pad, Compliant-Surface, Thrust Bearing," *Journal of Lubrication Technology, Trans. ASME*, presented Oct. 21-23, 1975, the authors reported experiments with tilting pads whose support surfaces were coated with a resilient rubber-like compound instead of babbitt. They noted that moving the pivot point of the pads over a range of 55% to 85% of pad length peak oil film pressure increases. Calculations of the applicant herein predicted decreasing oil film pressure in going from 50% of L to about 65% to 70% and then an increase. This correlates with the temperature data obtained by applicant. They do not specifically relate pad pivot location to bearing performance. Because of the subtlety of the phenomena involved in high load thrust bearings, no deductions can safely be made that their data would be applicable to babbitt coated bearing pads. The geometry of the bearing pads and test arrangement of Rightmire et al is also markedly different from what is described by the inventor of this application.

The data supporting the unexpected results reported herein were obtained with the testing device depicted in the FIG. 4 exploded view. The device is composed of two semi-circular channel shaped sections having inside and outside rims 26 and 27 that define a circular channel whose flat bottom or base surface is marked 28. Two split rings 29 and 30 are adapted for being set in the channel. They have a plurality of holes such as the one marked 31 for receiving tilting disks 20 of various diameters. When the test device in FIG. 4 is in use the two channel sections are locked together to form a circular channel by means of socket-headed screws that fit into holes such as the one marked 32. During any given test, only one identical pair of tilting disks 20 are used. One disk in the pair is diametrically opposite of the other. In FIG. 4 the disk that is marked 20 and is shown inverted exposes the supporting spherical button 21. Its counterpart at the opposite side of the channel ring is shown in upright position as it would be during a test. Two tilting pad sectors 11 are used to make a test run. One is in place in the base ring in FIG. 4 and the other, which would be diametrically opposite, has been removed. Typically, the disks 20 fit in mating holes 31 in the sectors 30. The sectors 30 have notches 33 on the rims. These notches lie adjacent outside rim 27 of the base. There is a slot in the side rim 27 in which a straight key 34 can be inserted to engage with any of the notches 33. This permits locking the sector 30 in one position during a test. When the key 33 is removed, the sectors can be rotated in the channel to position the pair of disks 20 being used relative to the bearing pads 11. In other words, setting the angular position of notched sectors 30 rotationally causes the pivot point or contact point of the spherical button to be located at any selected distance P relative to the length L of the pad 11. In FIG. 4 there are three bearing pads shown adjacent the testing device to suggest that pads 11', 11" and 11'" of different thicknesses were used to corroborate that optimum pivot location prescribed by the present invention was independent of a practical range of bearing pad 11 thicknesses "t". The runner for imposing a load on the upper surfaces of test pads 11 has been omitted from FIG. 4.

Some of the conditions that were established for the tests are: to keep support disks 20 always fully within the trailing and leading edge of the pads; not to exceed runner speeds of 4000 rpm to avoid non-laminar film conditions; limit maximum load to 600 psi to avoid failing any bearing and preserving the ability to get valid data; limiting maximum pad temperature to 121° C. (250° F.); the lubricant would be turbine oil type ISO VG32; oil inlet temperature would be held between 48.6° C. (119.5° F.) to 49.2° C. (120.5° F.); and oil would be circulated at about 57 liters per minute. The criteria for bearing performance would be inferred from heating effects. Accordingly, all of the test tilting pads 11 had several thermal sensitive detectors such as thermocouples, not visible mounted in contact with the babbitt facing at various locations. The electric leads from these sensors are shown as coming out of opposite ends of the pads in FIG. 4 and are marked 35 and 36.

The pads 11 are held against rotation in the channel shaped base ring by means of pins 37 and 38 that extend radially outwardly and inwardly and nest in notches in rim 27. The notches are deep enough so that the pins 37 do not rest on their bottoms in which case the pads tilt exclusively on the circular support disks 20 and their pivoting spherical buttons 21.

The charts presented as FIGS. 5-12 present some of the test data that corroborates the concepts of the present inventor that the pivot location P should be in the range of 0.70 to 0.80 of L. In these charts, there are different independent variables.

Figure 5:
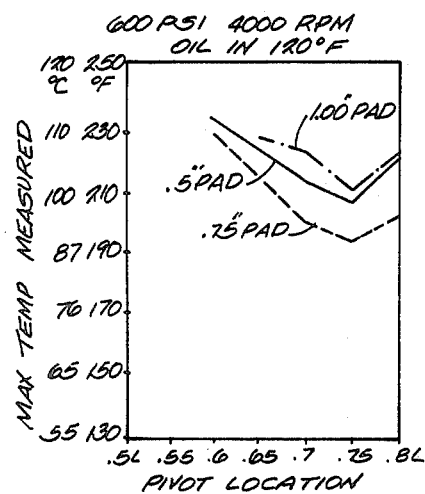

In FIG. 5 and in the other charts of FIGS. 6-12 too, the maximum measured temperature of the tilting pads during a particular test run is plotted against pad pivot location. Maximum temperature, wherever detected in the pad, is indicative of bearing performance. In FIG. 5, curves 1, 2 and 3 are for different bearing pad thicknesses. Curve 1 is based on a pad 11 thickness of 0.50 inch (12.7 mm). Curve 2 is based on a pad of 0.75 inch (19.05 mm) and curve 3 is based on a pad 1.00 inch (25.4 mm) thick. The load on the pads was 600 psi, the button disk diameter was 1.50 inches (38.1 mm) and rotational speed of the runner was 4000 rpm. Note that maximum measured temperature spot in the bearing pads drops rapidly for all pad thicknesses and stays low in a pivot location range of 0.70 to 0.80 of L. Minimum pad temperature occurs for all pad thicknesses where the ratio P/L is about 0.75. This is the preferred location for the pivot with any combination of test conditions. The range between the limits of 0.70 to 0.80 of L is designated as preferred because in all cases maximum measured temperature of the pad at 0.80 L had increased again to the same temperature from which the pad dropped after 0.70 L.

Figure 6:
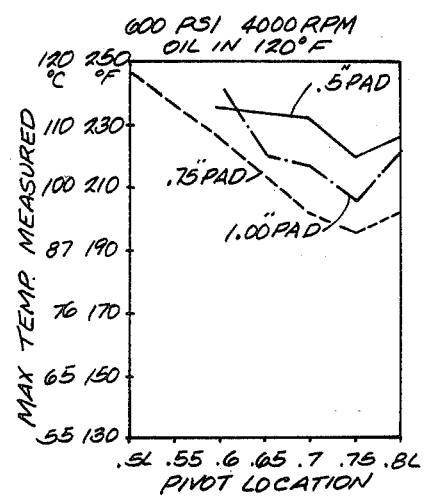

The FIG. 6 chart has all of the conditions of the FIG. 5 test held constant except that the button disk 20 in FIG. 6 has an outside diameter of 0.75 inch (19.05 mm) in FIG. 6 as opposed to 1.50 inch (38.1 mm) in FIG. 5. Here again, the temperature in the zone of maximum measured temperature of the bearing pad begins to fall off sharply where the pivot location ratio of P/L is about 0.70 and as in the previous test, maximum temperature did not rise to where it was at about 0.70 L until a pivot location of 0.8 L is reached. In FIG. 6, curve 1 is based on use of a pad 11 having a thickness of 0.50 inch (12.7 mm). Pad 2 had a thickness of 0.75 inch (25.4 mm) and curve 3 relates to a pad thickness of 1.0 inch (25.4 mm).

Figure 7:
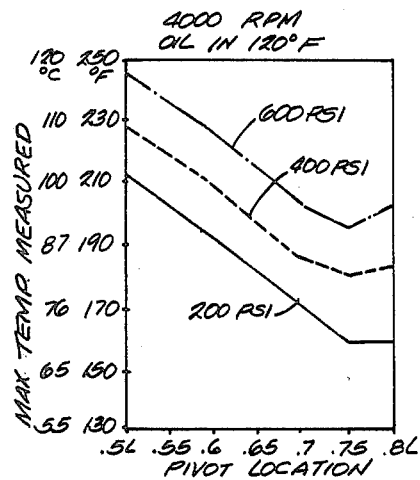

In FIG. 7, pads having the same thickness, 0.75 inch (19.05 mm), as in the FIG. 6 test are used. The button disk diameter is also the same for the two tests and so is the rpm. In the FIG. 7 test different load pressures were applied. The curve marked 1 is based on a pressure of 200 psi. Curves 2 and 3 are based on pressures or loads of 400 psi and 600 psi, respectively. Note that in all cases, performance, as represented by low maximum measured temperature in the pads, improves substantially where the pivot location P/L is in the range of 0.70 to 0.80 of L and the lowest maximum temperature occurred at about where P/L is 0.75.

Figure 8:
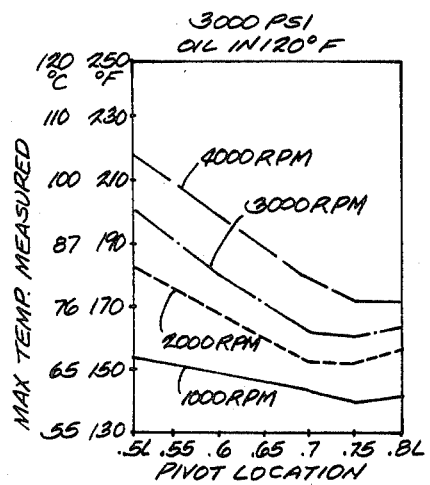

In FIG. 8, the load on the pads was held at 300 psi, pad thickness "t" was 0.75 inch and the diameter of the support disk 20 was 0.75 inch. Here the pressure was held constant, the pad thickness and button diameter were the same as in the FIG. 7 charts. Rotational speed in rpm is the variable in the FIG. 8 test. The curve marked 1 is based on rotating the runner at 1000 rpm. Curves 2, 3 and 4 are for increasing speeds of 2000, 3000 and 4000 rpm. Note again that maximum measured temperature on the pad was lowest when P/L is 0.75. Again, the maximum temperature at P/L at 0.8 is about the same as it was at 0.7 and the lowest temperature occurred when P/L was 0.75.

Figure 9:
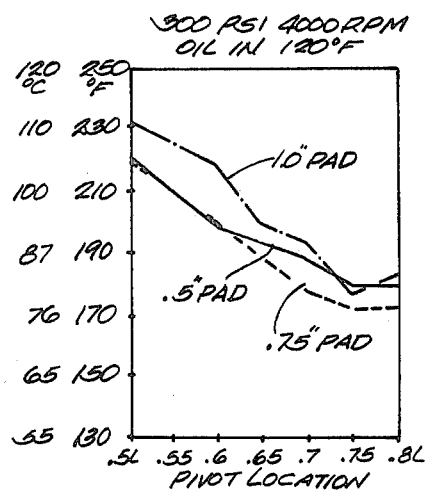

In FIG. 9, the tilting disk 20 is 0.75 inch (19.05 mm) thick and the load force is 300 psi as was true in the FIG. 8 test. In the FIG. 9 test rotational speed is 4000 rpm as it was in curve 4 of the FIG. 8 test. In FIG. 9, pad thickness is the independent variable. In the curve marked 1, pad thickness is 0.50 inch (12.7 mm). In curves 2 and 3, pad thickness is 0.75 inch (19.05 mm) and 1.00 inch (25.4 mm). As was demonstrated in the preceding graphs, maximum measured temperature on the tilting pads 11 was lowest in the range of 0.70 to 0.80 for P/L. Under the test conditions of the FIG. 9 chart, the benefit of having the P/L in the range of 0.70 to 0.80 is achieved regardless of pad thickness. As in other cases, the maximum measured pad temperature at P/L of 0.70 and 0.80 is the same.

FIG. 10 is a curve of maximum pad temperature versus pivot position where the runner is rotating at 2000 rpm. During this test, a tilting support disk 20 having an outside diameter "d" of 1.5 inch (38.1 mm) was used. The radial dimension of the sector shaped tilting pad 11 is identified as "b". The independent variable in FIG. 10 is the ratio t/b versus maximum temperature. Here again, it will be seen that the maximum pad temperature drops substantially after the pivot position as a percent of pad arc, L, exceeds 65%. The best range is from 0.70 to 0.80 of L. The temperature at 0.70 of pad arc is just about equal to the temperatures at 0.80 of pad arc. The temperature of the pad at the hottest spot is the lowest when the pivot position is about 75% of the pad arc length L. In the FIG. 10 test run, curve 1 is based on having the ratio t/b be the variable. The dimension "b" is actually fixed for any given test run and it is the thickness "t" that is actually varied by substituting different pads for consecutive test runs. By way of example, in FIG. 10, curve 1 is for a t/b equal to 0.13. Curves 2 and 3 are for t/b equal to 0.20 and 0.27.

In the FIG. 11 test runs, the ratio of the diameter "d" of the support disk 20 to the pad radius "b" or d/b is the independent variable. For the test bearing pads, the dimension "b" is 95 mm. By way of example, d/b for curve 1 is 0.2. d/b for curves 2 and 3 are 0.4 and 0.6, respectively. In this test run, the maximum pad temperature where the pivot position as a percent of pad arc is at about 0.70 is equal to the maximum pad temperature where the pivot position of the pad arc is equal to 0.80. As in other of the test runs, the lowest maximum pad temperature occurs where the pivot position is about 75% of the pad arc.

With the hottest spot on the pads being at the lowest temperature where the pivot is located between 70% and 80% of pad arc length, it follows that the film thickness at the trailing edge must necessarily be thicker than it would otherwise be at different pivot locations. During a test run, the load and speed conditions desired were set and maintained for a minimum of ten minutes. A reading was taken when the oil supply temperature was within the limits of 48.6° C. to 49.2° C. If not, adjustments were made to bring it within limits and data was then recorded. The data collected consisted of temperatures from 8 thermocouples embedded in each of the two diametrically opposite test pads plus the oil inlet and drain, plus the oil flow, bearing load and shaft speed. The data acquisition program averaged the two temperatures at a corresponding specific location on each of the two pads and also recorded the difference. The difference was typically less than 3° C. and often less than 1° C. This gave confidence in the load equalization between pads and in the consistency of the thermocouple installations. The thermocouple locations were chosen to cover an area where the highest pad temperatures have normally been found, both by theoretical analysis and tests. It is evident that the effect of the pivot position was clear and consistent. The lowest temperatures were found in the pads during tests with the pivot at 75% of pad arc. It necessarily follows that reduced unit pressure in the lubricant film and increased film thickness result from reducing film temperatures.

Figure 16:
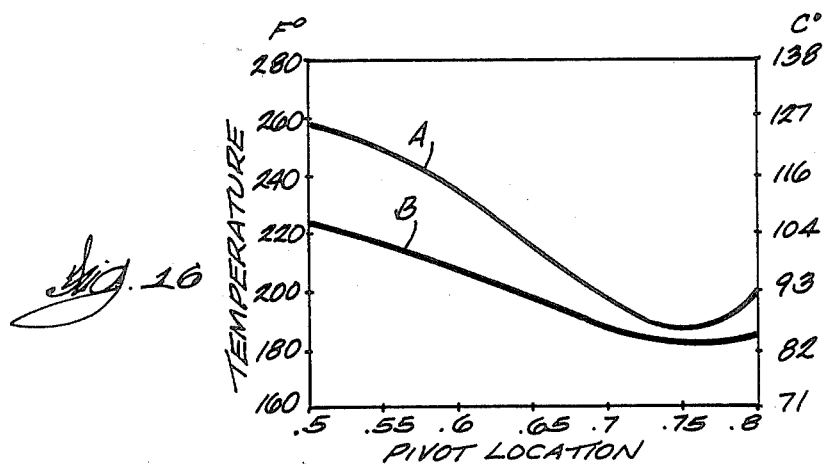
FIG. 16 is a graph of bearing pad pivot location versus maximum measured pad temperature for a case A where the pad is made of steel and case B where the pad is made of a copper alloy and in both cases the tilting axis button is made of hard steel, said graph relating to the FIGS. 12 and 13 embodiment.

An alternative implementation of the invention will now be described in reference to FIGS. 12, 13 and 16.

Figure 12:
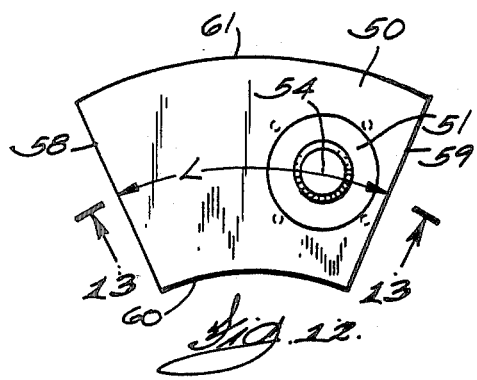
FIG. 12 is a plan view of an alternative form of a sector shaped bearing pad embodying the invention.

FIG. 12 is a bottom plan view of an alternative form of a bearing pad.

As shown in FIG. 12, the bearing pad 50 is comprised of a sector of a ring. The pad has a tilting button insert 51 embedded in it. A section through the button 51 is shown in FIG. 13 where it is evident that the button is fitted snuggly into a recess 52 and makes good contact with the bearing pad body 50. As in the FIG. 3 embodiment, the button has a convex projection 53 which is curved so as to make substantially a point contact at 54 with stationary base ring 55 of the bearing assembly. The face of the pad 50 has a layer 56 of babbitt bonded to it which interfaces with the sliding or rotating runner 57 which would be mounted to a shaft such as the one marked 12 in FIG. 1. The hydrodynamic phenomena discussed relative to the FIG. 3 embodiment applies to the FIGS. 12 and 13 embodiment as well.

Figure 13:
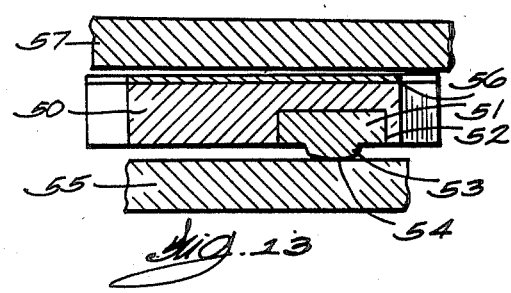
FIG. 13 shows a vertical sectional view of the FIG. 12 bearing pad taken on a line corresponding to 13—13 together with a section of a runner and a section of a stationary base plate.

Bearing pads having the elements of the pads depicted in FIGS. 12 and 13 have been used before the present invention was made. However, in prior usage, the contact point 54 of the button 51 was located at about 60% of L where L is the arc length between the leading edge 58 of the bearing pad and the trailing edge 59 as illustrated in FIG. 12. In accordance with the invention, the bearing pivot point 54 is between 70% and 80% of L and, most desirably, at 75% of L. Tests of two variations of the pad in FIG. 12 were made to confirm that having the pivot point 54 between 70% and 80% of L to obtain the lowest operation temperatures with a given load on the bearing held true for both variations. In the one variant, the pad 50 was composed of steel and in the other variant pad 50 was composed of an alloy of copper. In particular, a chromium/copper alloy was used. The FIG. 16 graph reveals the test results. The two curves are plots of bearing pivot location versus bearing pad temperature during test runs with a typical load on the bearing such as 600 psi. Curve A demonstrates the relation between pivot location and bearing pad temperature where the pad is comprised of steel and the insert 51 was comprised of hardened steel. Note in curve A, in accordance with the invention, the bearing ran at its minimum temperature when the pivot location was at 75% of L and that at 80% of L pad temperature had risen to about the same temperature prevailing in the bearing when it was run at the same load and pivot location was at 70% of L, thereby establishing that the permissible range of the pivot point would be between 70% and 80% of L to obtain the lowest operating temperatures. Incidentally, pivot point 54 in the embodiment of the pad illustrated in FIG. 12 is substantially equidistant between the radially inward edge 60 of the bearing pad and its radially outward edge 61.

Figure 14:
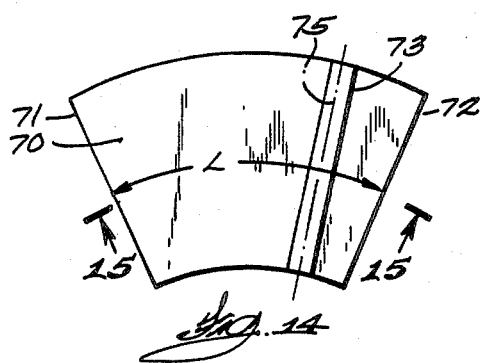
FIG. 14 is a plan view of another sector shaped bearing pad embodying the invention.
Figure 15:
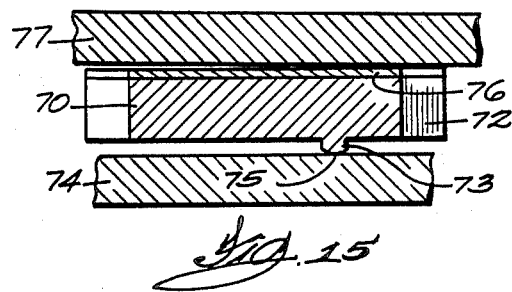
FIG. 15 shows a vertical sectional view of the FIG. 14 bearing pad taken on a line corresponding to 15—15 in FIG. 14 together with a section of a runner and a section of a stationary base plate.

Another basically well known type of bearing pad was tested to determine if locating the line of pivot of the pad at 70% to 80% of L was valid for this type of pad. In FIG. 14, the pad is identified generally by the numeral 70 and it has leading and trailing edges 71 and 72, respectively. In this design, there is a rib 73 formed integrally with the pad and projecting from the bottom of the pad. As is evident in FIG. 15, rib 73 has a curved face which causes contact between the rib 73 of the pad and stationary base ring 74 to occur along a radially extending line 75. Contact line 75 is located at 75% of L or, in other words, 75% of the distance between the leading and trailing edges of the pads 71, and 72, respectively. In the FIGS. 14 and 15 embodiment, the bearing is coated with babbitt 76 and the runner 77 is running on the babbitt surface with an oil film developed between the babbitt and runner due to the tilt of the pad on line 75.

Tests were made with two variants of the FIG. 14 embodiment. In one series of tests, the bearing pad 70 and rib 73 were integral and composed of relatively hard steel. In another variant, the bearing pad 70 and rib 73 were composed of a chromium/copper alloy. The results of the tests are summarized in the FIG. 17 graphs.

Figure 17:
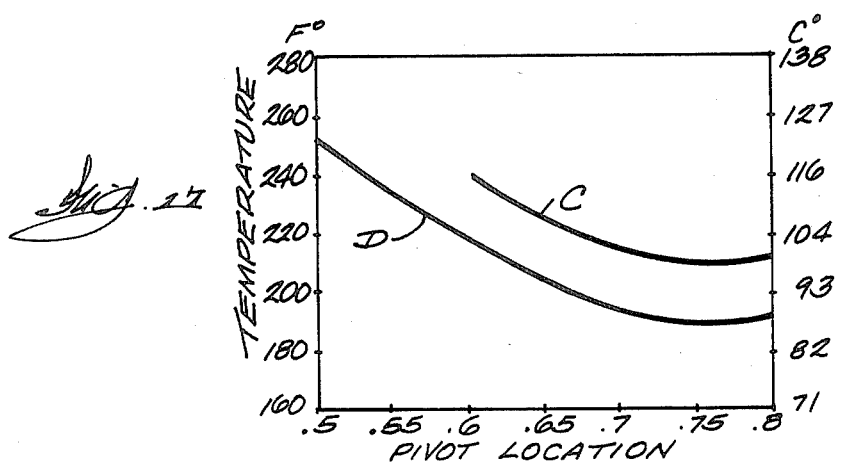
FIG. 17 is a graph of bearing pad pivot location versus maximum measured pad temperature for a case C where the pad is made of steel and a case D where the pad is made of copper alloy, said graph relating to the FIGS. 14 and 15 embodiment.

In FIG. 17, curve C applies to the all steel bearing pad 70 and curve D applies to the all copper alloy bearing pad. FIG. 17 shows that for bearing pads having the configuration of the pad in FIG. 14 and made of steel or copper alloy, the lowest bearing pad operating temperatures at a given load occurred when the tilting axis for line contact 75 was located in the range of 70% to 80% of L, the distance between leading and trailing edges 71 and 72, respectively. Moreover, FIG. 17 demonstrates again that, in accordance with the invention, the optimum location for the pivot axis of the pad is at 75% of L as inferred from the fact that that is the pivot line location which results in the bearing operating at the lowest temperature for a given load such as 600 psi.

I claim:

1. In a thrust bearing having a plurality of bearing pads arranged in circumferential spaced relation over a planar support surface in a circular retainer means for supporting a runner which is rotatable on said pads, said bearing pads each having a layer of babbitt comprising a top surface on which said runner is supported, a bottom surface opposite of said top surface, radially inner and outer edges and, generally radially extending leading and trailing edges spaced apart circumferentially to define the width of said pads for said runner to run in a direction extending from said leading to said trailing edges, disk means having bottom surfaces and opposite top surfaces on which said bottom surfaces of said pads, respectively, are supported, and, pivot means protruding from said bottom surfaces of the disk means for bearing on said planar surface in said retainer means to allow said pads to tilt relative to said runner about radially extending tilt axes, said radially extending tilt axes being located at between 70% and 80% of the width of said pads from said leading edge to said trailing edge.

2. The bearing according to claim 1 wherein said leading and trailing edges of said pads diverge radially outwardly and the width of said pads corresponds to the length of an arc extending from said leading to said trailing edges midway between said radially inner and outer edges of said pads.

3. The bearing according to claim 1 wherein said pivot means protruding from said disk means is an element having a spherical surface for making substantially tangential contact with said planar support surface for said pads.

4. The bearing according to any one of claims 1, 2 or 3 wherein said tilt axis is located particularly at about 75% of said pad width.

5. In a thrust bearing having a plurality of metal bearing pads arranged in circumferential spaced relation over a planar support surface in a circular retainer means for supporting a runner which is rotatable on said pads, said bearing pads each having a layer of babbitt comprising a top surface on which said runner is supported, a bottom surface opposite of said top surface, radially inner and outer edges and, generally radially extending leading and trailing edges spaced apart circumferentially to define the width of said pads for said runner to run in a direction extending from said leading to said trailing edges, pivot means protruding from the bottom surfaces of each of said pads for bearing on said planar support surface in said retainer means to allow said pads to tilt relative to said runner about radially extending tilt axes, said radially extending tilt axes being located respectively at between 70% and 80% of the width of said pads from said leading edge to said trailing edge.

6. In a thrust bearing having a plurality of metal bearing pads arranged in circumferential spaced relation over a planar support surface in a circular retainer means for supporting a runner which is rotatable on said pads, said bearing pads each having a layer of babbitt comprising a top surface on which said runner is supported, a bottom surface opposite of said top surface, radially inner and outer edges and, generally radially extending leading and trailing edges spaced apart circumferentially to define the width of said pads for said runner to run in a direction extending from said leading to said trailing edges, said bearing pads, respectively, having a recess in said bottom surface and an element inserted in said recess, said element having a protruding spherical surface for bearing on said planar support surface and making substantially tangential point contact with said surface on radially extending tilt axes to allow said pads to tilt relative to said runner, said radially extending tilt axes being located at between 70% and 80% of the width of said pads from said leading edge to said trailing edge.

7. The bearing according to claim 6 wherein said pad is composed of a copper alloy and said element is composed of steel.

8. The bearing according to any one of claims 6 or 7 wherein said tilt axis is located particularly at about 75% of said pad width.

9. In a thrust bearing having a plurality of bearing pads arranged in circumferential spaced relation over a planar support surface in a circular retainer means for supporting a runner which is rotatable on said pads, said bearing pads each having a layer of babbitt comprising a top surface on which said runner is supported, a bottom surface opposite of said top surface, radially inner and outer edges and, generally radially extending leading and trailing edges spaced apart circumferentially to define the width of said pads for said runner to run in a direction extending from said leading to said trailing edges, said bearing pads, respectively, having rib means protruding from said bottom surface, said rib means having sufficient length to extend substantially over the distance between said radially inner and outer edges of the pad, said rib means having a small curvature transverse to said length for bearing on said planar support surface and making substantially tangential line contact with said surface on radially extending tilt axes to allow said pad to tilt relative to said runner, said radially extending tilt axes being located at between 70% and 80% of the width of said pads from said leading edge to said trailing edge.

10. The bearing according to claim 9 wherein said pad and said rib means are integral and composed of steel or copper alloy.

11. The bearing according to any one of claims 9 or 10 wherein said tilt axes are located, respectively, at about 75% of pad width.

* * * * *